(12) United States Patent
Patrignani

(10) Patent No.: US 7,241,072 B2
(45) Date of Patent: Jul. 10, 2007

(54) CONNECTING DEVICE FOR TUBULAR ELEMENTS

(75) Inventor: Patrizio Patrignani, S. Ippolito (IT)

(73) Assignee: Cean Company S.p.A., Bellocchi Di Fano (Pesaro) (IT)

( * ) Notice: Subject to any disclaimer, the term of this patent is extended or adjusted under 35 U.S.C. 154(b) by 239 days.

(21) Appl. No.: 10/503,009

(22) PCT Filed: Jan. 31, 2002

(86) PCT No.: PCT/IB02/00302

§ 371 (c)(1),
(2), (4) Date: Jul. 29, 2004

(87) PCT Pub. No.: WO03/064866

PCT Pub. Date: Aug. 7, 2003

(65) Prior Publication Data

US 2005/0042024 A1    Feb. 24, 2005

(51) Int. Cl.
*F16B 7/04* (2006.01)
*F16B 3/00* (2006.01)
*F16D 1/00* (2006.01)
*F16L 41/00* (2006.01)

(52) U.S. Cl. ............... 403/174; 403/170; 403/297; 403/409.1

(58) Field of Classification Search ........... 403/297, 403/296, 292, 169, 170, 178, 174, 263, 309, 403/314, 409.1; 211/204, 206, 207
See application file for complete search history.

(56) References Cited

U.S. PATENT DOCUMENTS 3,695,649 A * 10/1972 Laverone ............ 403/231
3,946,547 A    3/1976 Salmoiraghi
5,588,336 A * 12/1996 Chou ................ 74/551.1
6,202,663 B1 * 3/2001 Uemura ............ 135/65
6,745,909 B1 * 6/2004 Lai .................. 211/206
2005/0002732 A1 * 1/2005 Choy

FOREIGN PATENT DOCUMENTS

| DE | 39 22 084 A | 1/1991 |
|----|-------------|--------|
| EP | 0 467 859 A | 1/1992 |
| IT | 1 213 982 B | 1/1990 |

* cited by examiner

Primary Examiner—Daniel P. Stodola
Assistant Examiner—Nahid Amiri
(74) Attorney, Agent, or Firm—William J. Sapone; Coleman Sudol Sapone P.C.

(57) ABSTRACT

A connecting device for tubular elements (1), for assembling the tubular elements into modular structures, includes a plurality of inserts (22), each insert having an expandable portion (2) and a head (3). Shells (9) are provided, each shell having a plurality of housings (10) having a shape approximately complementary to a shape of the head (3). The head may be fixed to a related housing (10). The insert (22) is locked into an end of the tubular element (1), when the expandable portion (2) is inserted into the end of the tube, and expanded. The tubular element (1) is connected to the shell (9), when the head (3) is in the locked condition, the tubular element (1) being engaged in a related housing (10) of the shell, and fixed to the shell by a fixing device.

6 Claims, 5 Drawing Sheets

Fig.7
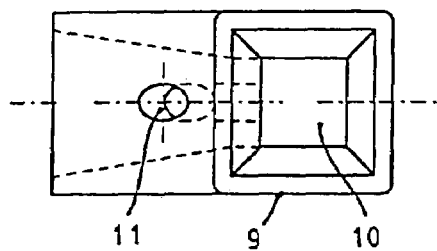
Fig.8
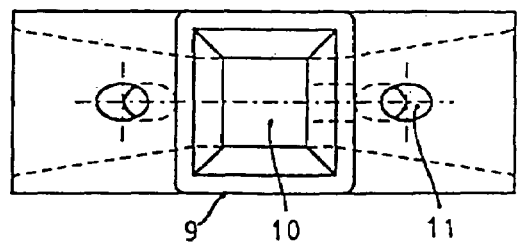
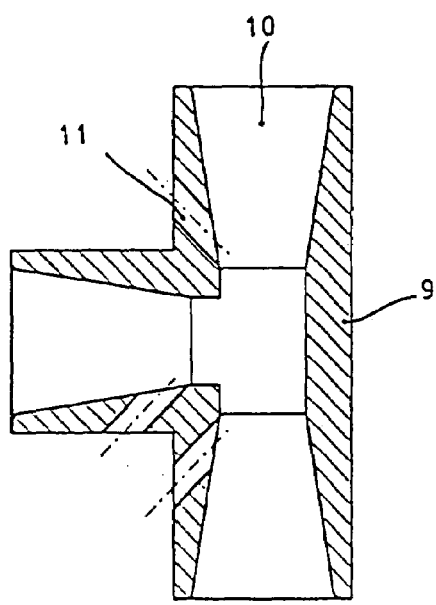
Fig.9
Fig.6
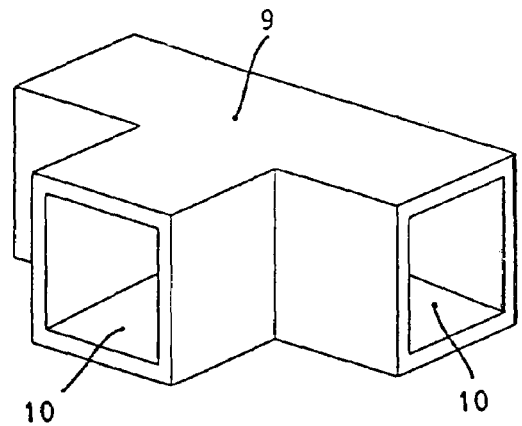

US 7,241,072 B2

CONNECTING DEVICE FOR TUBULAR ELEMENTS

TECHNICAL FIELD

The present invention refers to connecting devices for modular structures, particularly relates to a connecting device for tubular elements which allows the quick connection of said elements without requiring assembly holes made in these latter.

BACKGROUND ART

There are known connecting devices requiring the transverse drilling of the ends of the tubular elements in order to connect said tubular elements for assembling structures for use as shelves, tables, exhibitors, and the like. Consequently the lengths of the elements must be predefined during the manufacturing phase, since they cannot be easily changed.

There are known connecting devices allowing the connection between tubular elements without fixing holes, but said connecting devices are external with respect to said tubular elements.

The main drawback of said known devices consists in that they are bulky and very visible, so affecting the aesthetics of the whole structure. A further drawback of said known devices consists in that it is necessary to loosen several connecting devices, in order to modify the position of an element.

Document DE 94 13 840 U discloses a connecting device suitable for tubular elements fit for constructing modular structures, wherein said connecting device includes insert means having an expandable portion and a head, shells each provided with a plurality of housing having a shape approximately complementary to the head; fixing, means to fix the head to a related housing.

DISCLOSURE OF THE INVENTION

The main object of the present invention is to propose a connecting device for tubular elements having a small dimension and providing for fast connection between tubular elements, without the necessity to drill the end portions of said elements. The length of the tubular elements can be easily adapted to the customer's demands, during assembly.

The connecting device that will be described comprises an element having an expandable portion to be inserted into the tubular element to be connected and having a truncated-pyramidal head that protrudes therefrom which is inserted into the corresponding housing of a suitable multi-arm shell. The truncated-pyramidal head has an axial hole for an expansion screw and side seats, in which dowel ends are inserted. The dowels are screwed into holes provided in the arms of the shell, act as stops for the elements to be connected.

The objects above-mentioned are achieved according with the content of the claims.

BRIEF DESCRIPTION OF THE DRAWINGS

The characteristics of the invention are underlined in the following, with particular reference to the attached drawings, in which:

FIG. 6 shows an axonometric view of a shell of FIG. 1 device with three arms positioned along a plane;

FIG. 7 and 8 show respectively a side view and a front view of the FIG. 6 shell;

FIG. 9 show a plan sectional view of the shell of FIG. 6;

BEST MODE OF CARRYING OUT THE INVENTION

Figure 1:
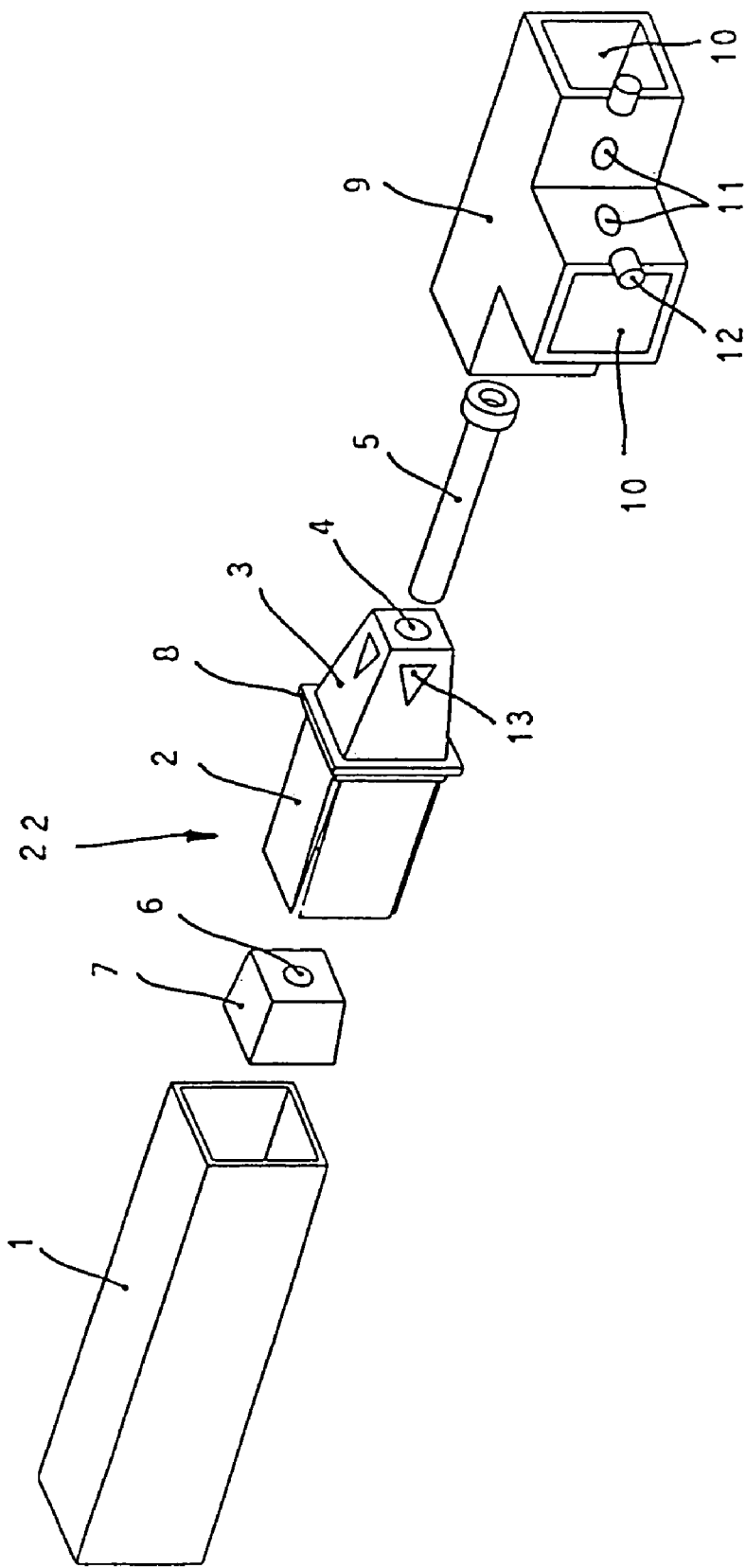
FIG. 1 shows an axonometric exploded view of the connecting device which is the object of the present invention in association with a tubular element.
Figure 2:
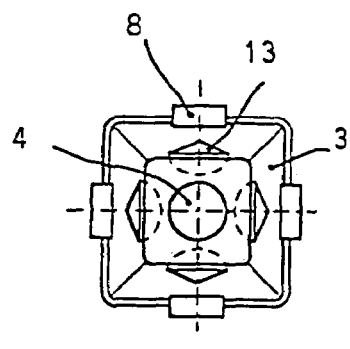
FIG. 2 shows a front view of an insert mean of the connecting device of FIG. 1.
Figure 3:
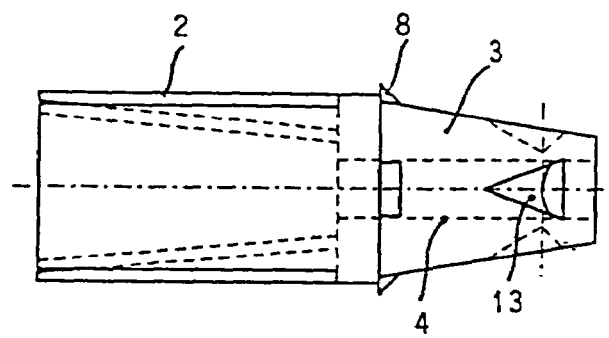
FIG. 3 shows a side view of the insert mean of FIG. 2.
Figure 4:
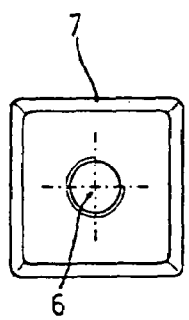
FIG. 4 and 5 show respectively a front view and a side view of a cap of the connecting device of FIG. 2.
Figure 5:
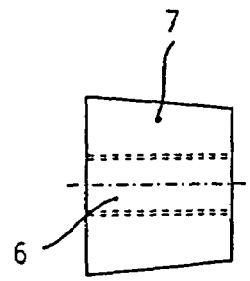
Figure 13:
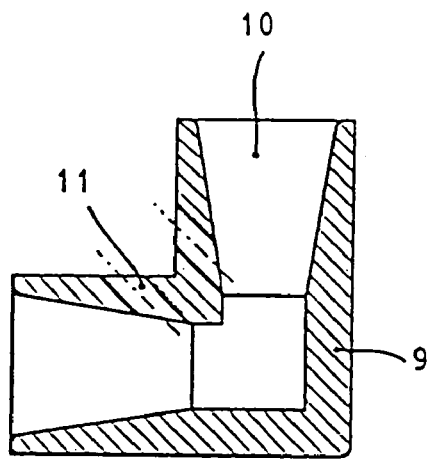
FIG. 13 shows a front section view of the shell of FIG. 10.
Figure 12:
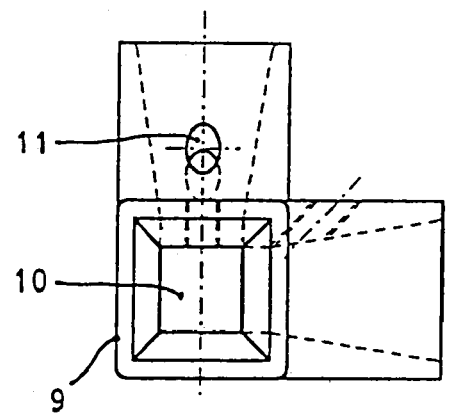
FIGS. 11 and 12 show respectively a plan and a side view of the FIG. 10 shell.
Figure 11:
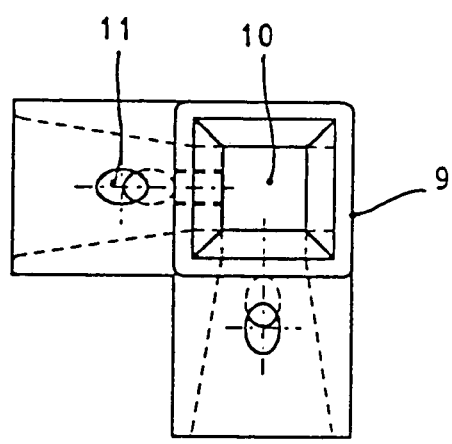
Figure 10:
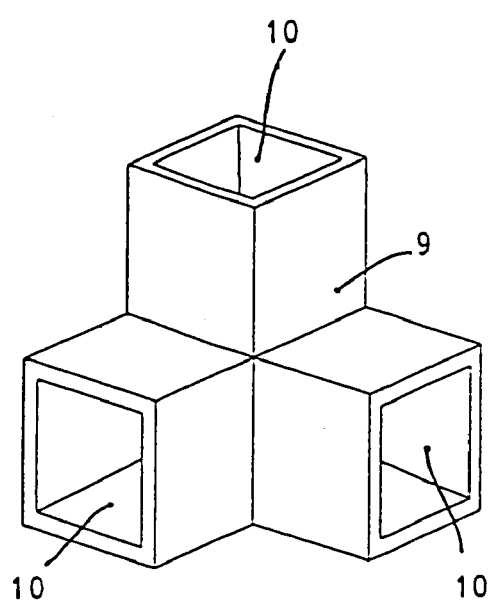
FIG. 10 shows an axonometric view of a shell with three arms positioned on different planes.
Figure 14:
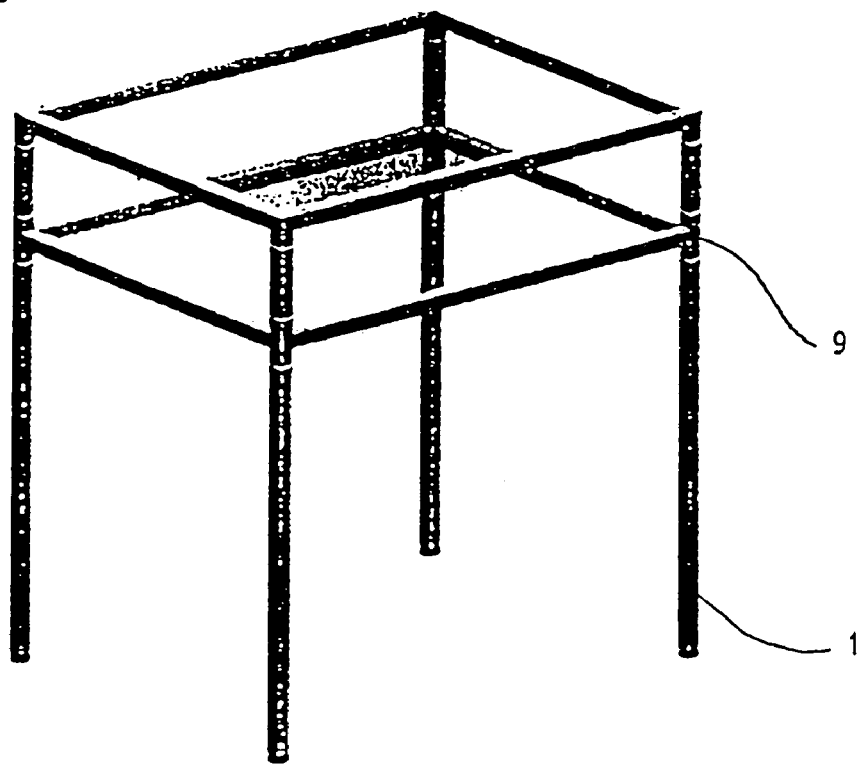
FIG. 14 shows an axonometric view of a possible structure made from tubular elements connected by means of the connecting devices which are the object of the present invention.
Figure 15:
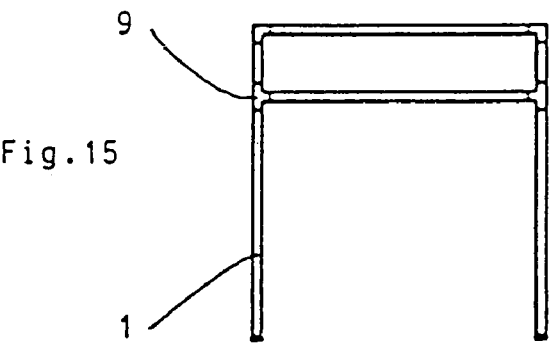
FIGS. 15 and 16 show respectively a front view and a side view of the structure of FIG. 14.
Figure 16:
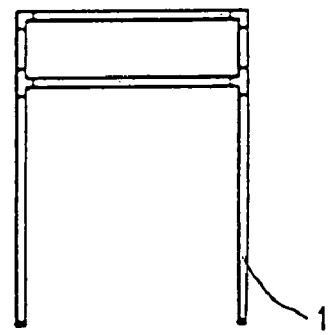

With references to FIGS. 1–9, numeral 1 indicates a tubular element to be connected to the connecting device to assemble a modular structure, exemplified in FIGS. 14–16. The connecting device includes a plurality of inserts 22, each having an expandable portion 2 and a head 3 which is approximately truncated-pyramidal shape.

The connecting device comprises a plurality of shells 9 each provided with a plurality of protruding arms, each having a housing 10 with a shape approximately complementary to the head 3.

The head 3 has an axial hole 4 for a screw 5, engaged in a threaded hole 6 of a cap 7 having inclined surfaces internally sliding over elastic fins of the expandable portions 2.

Each arm of the shells is provided with fixing means including dowels 12, each screwed in a threaded hole 11, provided in a shell 9, and engaged in a related side seat 13 of the head 3.

The threaded holes 11 are perpendicular to the longitudinal axis of the related housing.

Alternatively, the invention provides that the threaded holes 11 are inclined.

The expandable portion 2 and the internal cavity of the tubular elements are complementary and polygonal shaped, though it is possible that they can be circular or elliptical shaped.

The inert 22 includes a stop rim 8 which separates the expandable portion 2 and the truncated-pyramidal head 3, which is sized for matching the edge of the end of the tubular element.

The shell 9 has three perpendicular arms, and related housings 10, lying on a plane. The variant of shell 9 of FIGS. 10–13 has three perpendicular arms defining three perpendicular axis.

The invention provides also shells 9 having a number of arms from two up to more than six, and defining angles of 180°, 90°, 60°, 45° and/or others.

The operation of the device involves inserting the expandable portion 2 into the cavity of the tubular element 1 up to contact between the edges of the end of portion 2 and the stop rim 8. The rotation of the screw 5 causes the movement of the cap 7 and the expansion of the fins of the expandable portion 2 against the internal wall of the tubular element 1, reaching a locking condition between the insert 22, and the tubular element.

The head 3 of the insert 22, when in the locking condition with the tubular element 1, is engaged in a related housing 10 of the shell and fixed to the housing by the fixing means achieving a connection between the tubular element 1 and the shell 9.

The invention claimed is:

1. A connecting device for tubular elements (1) used for assembling modular structures, the connecting device comprising:

one or more inserts (22), each insert having an expandable portion (2) and a head (3), the expandable portion (2) being insertable into one end of one of the tubular elements (1), the expandable portion being expandable for being locked therein;

one or more shells (9), each shell provided with a plurality of housings (10) having a shape approximately complementary to the head (3), the head (3) being engageable in a housing (10) of the shell; and, fixing means for fixing the head (3) to a related housing (10), the head (3) and the housing (10) being approximately truncated-pyramidal shaped, the head (3) having an axial hole (4) for a screw (5), a cap (7) having inclined surfaces internally sliding over fins of the expandable portion (2), the screw being engagable in a threaded hole (6) of the cap, for causing the expansion of the expandable portion, for locking the insert (22) inside the tubular element (1).

2. The connecting device according to claim 1 wherein each housing (10) of the shell (9) has an arm protruding from the shell (9).

3. The connecting device of claim 1 wherein the expandable portion (2) and an internal cavity of a tubular element are complementary in shape, having a shape selected from the group consisting of approximately polygonal, circular or elliptical shapes.

4. A connecting device for tubular elements (1) used for assembling modular structures, the connecting device comprising:

one or more inserts (22), each insert having an expandable portion (2) and a head (3), the expandable portion (2) being insertable into one end of one of the tubular elements (1), the expandable portion being expandable for being locked therein;

one or more shells (9), each shell provided with a plurality of housings (10) having a shape approximately complementary to the head (3), the head (3) being engageable in a housing (10) of the shell; and, fixing means for fixing the head (3) to a related housing (10), the head (3) and the housing (10) being approximately truncated-pyramidal shaped, the fixing means having one or more dowels (12), each dowel screwed into a threaded hole (11), disposed in the shell (9), and engaged to a side seat (13) of the head (3) locked to the tubular element (1).

5. The connecting device according to claim 4 wherein the threaded holes (11) are perpendicular or inclined with respect to a longitudinal axis of the housing (10).

6. A connecting device for tubular elements (1) used for assembling modular structures, the connecting device comprising:

one or more inserts (22), each insert having an expandable portion (2) and a head (3), the expandable portion (2) being insertable into one end of one of the tubular elements (1), the expandable portion being expandable for being locked therein;

one or more shells (9), each shell provided with a plurality of housings (10) having a shape approximately complementary to the head (3), the head (3) being engageable in a housing (10) of the shell; and, fixing means for fixing the head (3) to a related housing (10), the head (3) and the housing (10) being approximately truncated-pyramidal shaped, the insert mean (22) having a stop rim (8) which separates the expandable portion (2) and the truncated-pyramidal head (3), the stop rim contacting an edge of an end of the tubular element (1) when the inserts are in a locked condition, with the inserts (22) locked into the end of the tubular element (1).

* * * * *